United States Patent [19]

Panster et al.

[11] Patent Number: 5,403,566
[45] Date of Patent: Apr. 4, 1995

[54] RECOVERY OF HYDROGENATION CATALYSTS FROM SOLUTIONS OF HYDROGENATED NITRILE RUBBER

[75] Inventors: Peter Panster, Rodenbach; Stefan Wieland, Offenbach am Main; Hartmuth Buding, Dormagen; Werner Obrecht, Moers, all of Germany

[73] Assignee: Bayer AG, Leverkusen, Germany

[21] Appl. No.: 243,535

[22] Filed: May 13, 1994

Related U.S. Application Data

[63] Continuation of Ser. No. 982,246, Nov. 25, 1992, abandoned, which is a continuation of Ser. No. 767,410, Sep. 30, 1991, abandoned.

[30] Foreign Application Priority Data

Oct. 13, 1990 [DE] Germany .................. 40 32 597.0

[51] Int. Cl.$^6$ .................. B01J 20/26; B01J 20/28; B01J 31/40

[52] U.S. Cl. .................. 423/22; 210/688; 428/402; 502/20; 528/9; 528/28; 528/30; 528/38

[58] Field of Search .................. 428/402; 528/9, 28, 528/30, 38; 210/688; 423/22; 502/20

[56] References Cited

U.S. PATENT DOCUMENTS

| | | | |
|---|---|---|---|
| 4,851,492 | 7/1989 | Panster et al. | 528/38 |
| 4,944,926 | 7/1990 | Osman et al. | 423/22 |
| 4,954,599 | 9/1990 | Panster et al. | 528/38 |
| 5,003,024 | 3/1991 | Panster et al. | 528/38 |
| 5,019,637 | 5/1991 | Panster et al. | 528/41 |
| 5,061,773 | 10/1991 | Panster et al. | 528/39 |
| 5,093,451 | 3/1992 | Panster et al. | 528/38 |

FOREIGN PATENT DOCUMENTS 0429017 5/1991 European Pat. Off.

Primary Examiner—D. S. Nakarani
Attorney, Agent, or Firm—Connolly & Hutz

[57] ABSTRACT

Rhodium and ruthenium catalysts can be recovered from solutions of hydrogenated nitrile rubber by addition onto organosiloxane-based absorbers.

2 Claims, No Drawings

RECOVERY OF HYDROGENATION CATALYSTS FROM SOLUTIONS OF HYDROGENATED NITRILE RUBBER

This application is a continuation of application Ser. No. 07/982,246, filed on Nov. 25, 1992, which was a continuation of application Ser. No. 07/767,410, filed on Sep. 30, 1991, both of which applications are now abandoned.

FIELD OF THE INVENTION

This invention relates to the use of absorbers for recovering compounds of rhodium and/or ruthenium, which have been used for the homogeneous catalysis of the hydrogenation of nitrile rubber (hereinafter: "NBR") from the solution of the hydrogenated nitrile rubber (hereinafter "HNBR"), the absorbers used being certain organosiloxane copolycondensates.

BACKGROUND OF THE INVENTION

HNBR is produced by the heterogeneously or homogeneously catalyzed selective hydrogenation of NBR with hydrogen in an organic solvent.

Little is shown about the recovery of homogeneous hydrogenation catalysts from HNBR solutions. In contrast to heterogeneous hydrogenation catalysts, homogeneous hydrogenation catalysts cannot be removed by simple filtration or centrifugation.

However, the undisputed advantages of homogeneous hydrogenation catalysts lie in their effectiveness in relation to the quantity used and in the fact that they are easy to obtain in constant quality.

For removing a dissolved rhodium complex catalyst from an NBR hydrogenation solution, U.S. Pat. No. 3,700,637 describes precipitation of the rubber from the chlorobenzene/m-cresol solution with methanol and subsequent repeated washing of the coagulated rubber with methanol until the methanol is no longer colored. The noble metal complex may then be obtained from the methanol collected. This is very complicated and very difficult to carry out on a production scale (tons) because, on contact with methanol, the dissolved rubber coagulates into large, tacky viscous lumps which can no longer be readily size-reduced for optimal washing with methanol. In addition, large quantities of solvent have to be handled.

EP-A 354 413 discloses a method for removing soluble Rh catalysts from HNBR solutions with excess, fine-particle organic additives which can adversely contaminate HNBR unless they are carefully removed again.

DESCRIPTION OF THE INVENTION

In the context of the invention, the expression NBR is understood to encompass copolymers of
a) 85 to 50% by weight and preferably 82 to 52% by weight conjugated diene,
b) 15 to 50% by weight and preferably 18 to 48% by weight unsaturated nitrile and
c) 0 to 10% by weight and preferably 0 to 8% by weight of one or more other monomers copolymerizable with conjugated dienes (a) and unsaturated nitriles (b).

Suitable conjugated dienes (a) are, for example, 1,3-butadiene, 2-methyl-1,3-butadiene, 2,3-dimethyl-1,3-butadiene and 1,3-pentadiene; suitable unsaturated nitriles (b) are acrylonitrile and methacrylonitrile.

Suitable other monomers (c) are aromatic vinyl compounds, such as styrene, o-, m- or p-methyl styrene, ethyl styrene, vinyl naphthalene and vinyl pyridine, $\alpha,\beta$-unsaturated monocarboxylic acids containing 3 to 5 carbon atoms, such as acrylic acid, methacrylic acid and crotonic acid, and $\alpha,\beta$-unsaturated dicarboxylic acids containing 4 to 5 carbon atoms, such as maleic acid, fumaric acid, citraconic acid and itaconic acid, also vinyl chloride, vinylidene chloride, N-methylol acrylamide and vinyl alkyl ethers containing 1 to 4 carbon atoms in the alkyl moiety.

Preferred nitrile rubbers have glass transition temperatures below 0° C., Mooney viscosities (DIN 53 523) of generally 10 to 150 and preferably 15 to 100 (ML 1+4) 100° C. and average molecular weights, determined as weight averages $\overline{M}_w$ in the range from 500 to 500,000, preferably in the range from 5,000 to 400,000, more preferably in the range from 10,000 to 350,000 and most preferably in the range from 15,000 to 300,000. The molecular weights $\overline{M}_w$ may be determined by gel permeation chromatography using polystyrene as standard.

Preferred hydrogenated nitrile rubbers have degrees of hydrogenation (percentage of hydrogenated C=C double bonds, based on the number of C=C double bonds originally present) of at least 80%, preferably at least 90%, more preferably at least 95% and, most preferably, at least 99%.

The degree of hydrogenation may be determined by IR or NMR spectroscopy.

In the context of the invention, "selective hydrogenation" is understood to be the hydrogenation of the olefinic C=C double bonds with the C≡N triple bonds remaining intact. The expression "with the C≡N triple bonds remaining intact" in this connection means that less than 7, preferably less than 5, more preferably less than 3 and most preferably less than 1.5% of the nitrile groups originally present in the NBR are hydrogenated. The hydrogenation may be monitored by IR and NMR spectroscopy.

Homogeneous catalysis in contrast to heterogeneous catalysis means that the starting product to be hydrogenated and the catalyst are homogeneously dissolved (in the present case in an organic solvent).

Rhodium and ruthenium compounds above all are recommended for the homogeneously catalyzed hydrogenation of olefinically unsaturated polymers with hydrogen, cf. for example DE-PS 25 39 132, DE-OS 33 37 294, 34 33 392, 35 29 252, 35 40 918 and 35 41 689, EP-A 134 023 and 298 386 and U.S. Pat. No. 3,700,637, 4,464,515, 4,503,196 and 4,795,788. The catalysts are generally used in quantities (expressed as metal) of 2 to 1,000 ppm, preferably 5 to 300 ppm and more preferably 8 to 200 ppm, based on the starting product to be hydrogenated. During working up of the hydrogenation product, they mostly remain in the product and, hence, cannot be reused. This is an important factor so far as costing is concerned. In addition, relatively large quantities of catalyst remaining in the product adversely affect its technological properties.

Accordingly, the problem addressed by the present invention was to remove the catalysts used in the homogeneously catalyzed hydrogenation of NBR at reasonable expense so that these valuable catalysts could be reused and quality products would be obtained.

It has surprisingly been found that the problem stated above can be solved by absorption of the catalysts onto certain organosiloxane copolycondensates.

Accordingly, the present invention relates to the use of absorbers for recovering compounds of rhodium and/or ruthenium, which have been used for homogeneous catalysis of the hydrogenation of NBR with hydrogen in organic solution, from the HNBR solution, the absorbers used being organosiloxane copolycondensates consisting of units corresponding to the following formula

   (I)

and of units corresponding to the following formula

   (II)

in which
R¹ to R⁵ may be the same or different and represent a group corresponding to the formula

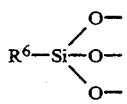   (III)

R⁶ is directly attached to the nitrogen atom or to the two-bond group X and is a linear or branched C₁₋₁₀ alkylene group, a C₅₋₈ cycloalkylene group or a unit corresponding to the following formula

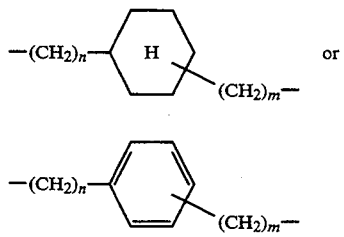

in which
n is a number of 1 to 6 and indicates the number of methylene groups in the nitrogen position or the X position and
m is a number of 0 to 6, the free valencies of the oxygen atoms attached to the silicon atom being saturated, as in silica structures, by silicon atoms of other groups corresponding to formula (III) and-/or via the metal atoms in one or more of the cross-linking bridge members

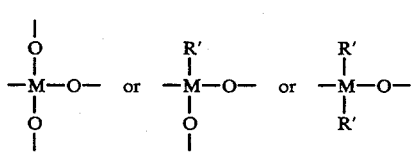   (IV)

or

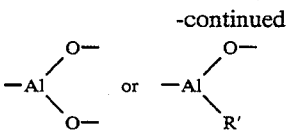

M is a silicon, titanium or zirconium atom and
R' is a linear or branched alkyl group containing 1 to 5 carbon atoms or a phenyl group and the ratio of the silicon atoms from the groups of formula (III) to the metal atoms in the bridge members (IV) is 1:0 to 1:20 and, in formula (II),
X represents

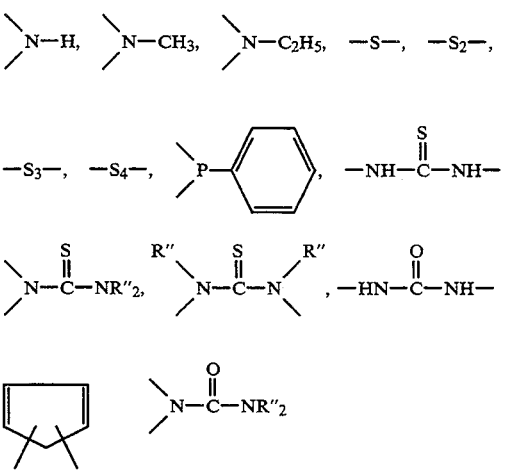

where
R" is H or a linear or branched C₁₋₅ alkyl group or a group (CH₂)ₙ—NR'"₂,
n is a number of 1 to 6 and
R'" is H or a linear or branched C₁₋₅ alkyl group.

In one particularly preferred embodiment, the organosiloxane copolycondensates are used in the form of macroscopically spherical particles having a diameter of 0.01 to 3.0 mm and preferably 0.05 to 2.0 mm, a specific surface of 0.0001 to 1,000 m²/g and preferably 0.001 to 700 m²/g, a specific pore volume of 0.01 to 6.0 ml/g and an apparent density of 50 to 1,000 g/l and preferably 100 to 800 g/l.

The copolycondensates used as absorbers in accordance with the invention are known from DE-OS 38 37 418.

The ratio of the units corresponding to formula (I) to units corresponding (II) may be (0.03:99.97) to (99.99:0.01) and preferably (5:95) to (95:5) mol-% without any problems arising in regard to the morphological, physical or chemical properties of the products to be used in accordance with the invention or in regard to their production.

The ratio used in practice depends primarily upon the required chemical and physical properties, i.e. for example on whether or not a high density of functional groups corresponding to formula (II) is required.

The monomeric units of the organosiloxane amine copolycondensates to be used in accordance with the invention are basically known compounds, for example corresponding to the following formulae:

 N[(CH₂)₃Si(OC₂H₅)₃]₃, $S[(CH_2)_3Si(OCH_3)_3]_2$, $HN[(CH_2)_{10}Si(OC_2H_5)_3]_2$, $C_6H_5-P[(CH_2)_2Si(OCH_3)_3]_2$, $S_4[CH_2-C_6H_4-Si(OC_3H_7)_3]_2$, $Si(OC_2H_5)_4$, $Ti(OC_3H_7)_4$, (N,N'-disubstituted and N,N,N'-/N,N,'N'-trisubstituted organyloxysilyl-functional thioureas additionally containing a tertiary amine function and methods for their production are described in German patent application P 39 25 356.2 filed 31.7.1989.)

The composition of the polymer units obtainable therefrom may be described by the following formulae:

$N[(CH_2)_3SiO_{3/2}]_3$, $S[(CH_2)_3SiO_{3/2}]_2$, $HN[(CH_2)_{10}SiO_{3/2}]_2$, $C_6H_5-P[(CH_2)_{10}SiO_{3/2}]_2$, $S_4[CH_2-C_6H_4-SiO_{3/2}]_2$, $SiO_{4/2}$ and $TiO_{4/2}$.

Even where they have the same chemical composition, the copolycondensates to be used in accordance with the invention may be present in totally different forms, i.e. as statistical copolycondensates, as block copolycondensates or even as so-called mixed copolycondensates. The copolycondensates may be present in each of the three forms mentioned in regard to the units corresponding to formulae (I), (II) and (IV). This means that, in the case of a purely statistical copolycondensate containing units corresponding to formulae (i) and (II) and, optionally, units corresponding to formula (IV), the components are statistically distributed in accordance with the molar ratios of the starting products, taking into account the particular silicon groups of formula (III) present in the case of units (I) and (II) and the functionality of the crosslinking group (IV). In the case of a block copolycondensate, blocks of the same units corresponding to formulae (i) and (II) and, optionally, (IV) are formed. Finally, a so-called mixed copolycondensate comprises both structures of a statistical copolycondensate and structures of a block copolycondensate. The units corresponding to formula (I) or formula (II) or formula (IV) may be present both as a statistical copolycondensate and as a block copolycondensate.

Particular advantages in regard to the availibity of the starting materials and the properties of the end products are obtained with co-condensates in which $R^1$ to $R^5$ represent a group corresponding to the following formula:

$$-(CH_2)_3-Si\begin{matrix}O-\\O-\\O-\end{matrix}$$

In principle, the alkoxysilylamine compounds may be replaced by the corresponding halide or phenoxy compounds as starting materials for the process for the production of the copolycondensates to be used in accordance with the invention, although the use of the corresponding halide or phenoxy compounds does not afford any advantages; on the contrary, the chlorides, for example, can cause difficulties through the hydrochloric acid released during hydrolysis.

In one particularly preferred embodiment of the invention, the copolycondensates are used in spherical form. They may be produced, for example, by dissolving a tertiary amino-organosilane corresponding to the following formula $$N\begin{matrix}R^7\\-R^8\\R^9\end{matrix} \qquad (V)$$

together with an organofunctional silane corresponding to the formula $$X\begin{matrix}R^{10}\\R^{11}\end{matrix} \qquad (VI)$$

in accordance with the desired stoichiometric composition of the copolycondensate to be produced, $R^7$ to $R^{11}$ being the same or different and representing a group corresponding to the formula $$R^6-Si(OR^{12})_3 \qquad (VII)$$

where
$R^6$ has the same meaning as in formula (III) and
$R^{12}$ is a linear or branched alkyl group containing 1 to 5 carbon atoms, and
X having the same meaning as in formula (II), optionally after addition of one or more crosslinking agents corresponding to the formula $$M(OR)_{2-4} R'_{0-2} \text{ or } M(OR)_{2-3} R'_{0-1} \qquad (VIII)$$

in which
M is a silicon, titanium, zirconium or aluminium atom,
R' is a linear or branched $C_{1-5}$ alkyl group or a phenyl group and
R is a linear or branched $C_{1-5}$ alkyl group and the ratio of the silicon atoms from the groups corresponding to general formula (VII) to the metal atoms in the crosslinking agents (VIII) is from 1:0 to 1:20, in a substantially water-miscible solvent which dissolves the amino-organosilane (V) and the organofunctional silane (VI) and also the crosslinking agent (VIII) and adding water to tile resulting solution stirring in a quantity at least sufficient for complete hydrolysis and condensation, leaving the reaction mixture to gel with continued stirring at a certain temperature in the range from room temperature to 200° C., with the proviso that, at the beginning of gelation or up to 1 hour thereafter, from 10 to 2,000% by weight and preferably from 50 to 500% by weight, based on the total quantity of aminoorganosilane (V), organofunctional silane (VI) and optionally crosslinking agent (VIII), of a substantially water-insoluble solvent which dissolves the (partly) gelled reaction mixture is added to the reaction mixture and homogenized therewith, adding 10 to 2,000% by weight and preferably 50 to 500% by weight, based on the total weight of amino-organositane (V), organofunctional silane (VI) and, optionally, crosslinking agent (VIII) of water to the viscous homogenizate either immediately or over a period of up to 3 hours, optionally with an increase in the temperature originally adjusted, dispersing the organic phase now containing siloxane in the liquid two-phase system and separating the solid formed in the form of spheres from the liquid phase after a sufficient reaction time at room temperature to 200° C., optionally followed by extraction, drying at room temperature to 250° C., optionally in an inert gas or in vacuo, and heating at temperatures of 150° to 300° C. over a period of 1 to 100 hours.

The hydrolysis of the starting material and, optionally, the crosslinking agent has to be carried out in a substantially water-miscible solvent which dissolves the starting materials. Preferred solvents are alcohols which correspond to the alkoxy groups at the monomeric intermediate stages of the starting materials or at the metal atoms of the crosslinking agent optionally used. Methanol, ethanol, n- and i-propanol, n- and i-butanol or n-pentanol are particularly suitable solvents. Mixtures of these alcohols may also be used as solvents for the hydrolysis reaction. Instead of alcohols, it is also possible to use other polar solvents which are substantially miscible with water, although, in terms of process technology, this is not advisable on account of the solvent mixtures formed with the alcohol eliminated by hydrolysis.

The hydrolysis is preferably carried out with an excess of water over and above the stoichiometrically necessary quantity. The quantity of water required for hydrolysis is determined by the hydrolysis rate of the particular amino-organosilane or crosslinking agent used to the extent that hydrolysis takes place more quickly, the larger the quantity of water used. However, an upper limit can be imposed by incipient separation and formation of a two-phase system. Basically, hydrolysis in homogeneous solution is preferred. In view of the two aspects mentioned, a slightly smaller quantity by weight of water than the organosilanes plus crosslinking agent is used in practice.

The hydrolysis time depends upon the tendency of the starting material and/or crosslinking agent towards hydrolysis and upon the temperature. The affinity for hydrolysis and, hence, the hydrolysis rate are determined in particular by the type of silicon or titanium, zirconium, aluminium alkoxy groups, the methoxy group hydrolyzing in the quickest time and the hydrolysis rate slowing down with increasing chain length of the hydrocarbon radical. In addition, the total duration of hydrolysis and polycondensation is also dependent on the basicity of the aminoorganosilane. It is known that amines function as condensation accelerators by promoting autocatalysis. Accordingly, hydrolysis and polycondensation can be accelerated by addition of bases, preferably ammonia, or inorganic or organic acids, and also typical condensation catalysts, such as dibutyl tin diacetate.

Accordingly, the need to keep the starting material, dissolved in solvents and crosslinked with water, at a certain temperature with continued stirring means that the velocity of the polycondensation reaction reflected in gelation is temperature-dependent.

The temperature to be applied in the hydrolysis or gelation phase is empirically established in each individual case. It is important in this regard to ensure that a solids-free, liquid-permeated gel-like mass remains intact for the subsequent process step, the so-called shaping phase.

The shaping phase, which accompanies the conversion of the coherent liquid-permeated gel-like mass (in which the condensation reaction continues) into separate spherical particles, begins with the addition to the (partly) gelled reaction mixture of a substantially water-insoluble solvent in which the reaction mixture is sufficiently soluble in the intended quantity.

Suitable solvents are, for example, linear or branched alcohols containing 4 to 18 carbon atoms or phenols, linear or branched, symmetrical or asymmetrical dialkyl ethers and also diethers or triether (such as ethylene glycol dimethyl ether), chlorinated or fluorinated hydrocarbons, aromatic hydrocarbons substituted by one or more alkyl groups or mixtures of such hydrocarbons, such as toluene or xylene for example, substantially water immiscible symmetrical and asymmetrical ketones.

However, a linear or branched alcohol containing 4 to 12 carbon atoms, toluene or o-, m-, p-xylene, is added individually or in admixture to the (partly) gelled reaction mixture.

After homogenization with the reaction mixture, the addition of this solvent dilutes the reaction mixture and, hence, clearly decelerates the condensation reaction accompanied by an increase in viscosity.

The quantity in which the solvent used in the shaping phase is added depends in particular by the particular particle size required for the shaped organosiloxane amine compound. Broadly speaking, a little solvent is sufficient for coarse particles (=spheres of relatively large diameter) whereas a large quantity of solvent has to be used for fine particles (spheres of relatively small diameter).

In addition, particle size is also influenced by the intensity with which the viscous homogenizate of the reaction mixture and the substantially water-insoluble solvent is dispersed in the additional water introduced as dispersant in the shaping phase. As a rule, the formation of relatively fine particles is promoted by vigorous stirring. Any of the known dispersion aids, such as long-chain carboxylic acids or salts thereof or polyalkylene glycols, may be used in typical concentrations for stabilizing the aqueous dispersion of the organic phase (now containing siloxane).

In one variant of the production process, part or even the total quantity of the substantially water-insoluble solvent to be added at or after the beginning of gelation may even be introduced during the hydrolysis phase in addition to the solvent used therein. Where only part of the solvent is added, the rest is added after the beginning of gelation.

In the extreme case where the total quantity of solvent is added, the dispersant, water, may be added at or after the beginning of gelation. This variant is preferably used when the mixture of organosilane and, optionally, crosslinker used shows an extremely high tendency towards hydrolysis and polycondensation.

The preferred temperature at which the siloxane-containing organic phase is dispersed in the aqueous phase and spherical solid particles are formed from the disperse phase is generally the reflux temperature of the mixture as a whole. Basically, however, the same temperatures as in the gelation phase may be applied. The total duration of the dispersion phase at the after-reaction is generally 0.5 to 10 hours.

Both gelation and shaping may be carried out at normal pressure or under an excess pressure which corresponds to the sum total of the partial pressures of the components of the reaction mixture at the particular temperature applied.

In the production of the crosslinked or uncrosslinked organosiloxane amines to be used in accordance with the invention, it can happen that one or more components of the mixture to be gelled differ(s) in its/their hydrolysis and polycondensation behavior, again in dependence upon the type of alkoxy groups. In this case, the production process is characterized in that the crosslinking agent(s) (VIII) and/or the organofunctional silane (VI) is not subjected to gelation together with the amino-organosilane (V), instead the amino-organosilane is first separately gelled, optionally together with the crosslinking agent (VIII) or the organosilane (VI), homogenized with the substantially water-insoluble solvent and the crosslinking agent(s) or the organosilane are subsequently added to the homogenizate.

However, the solvent and the missing silane component may also be added simultaneously to the gelled aminoorganosilane and, optionally, crosslinking agent or organosilane.

The moist product in the form of spherical particles may be separated from the liquid dispersion medium by standard methods, such as decantation, filtration or centrifugation.

However, it is also possible to remove the liquid phase from the reactor and to treat the solid remaining behind in the reactor once or several times with a low-boiling extractant, preferably a low-boiling alcohol, in order to facilitate subsequent drying of the shaped material by at least partial replacement of the generally relatively high-boiling solvent of the shaping phase by the low-boiling extractant.

Basically, drying may be carried out at room temperature to 250° C., optionally in an inert gas or in vacuo. For hardening and stabilization, the dried shaped solid may be heated at temperatures of 150° to 300° C.

The dried or heated product may be graded into various particle size fractions in standard units. One or other of the working-up steps of extraction, drying, heating and grading may be omitted, depending on the circumstances. Grading may be carried out with liquid-moist, dried or heated product.

In order to correct any difference in the hydrolysis and polycondensation behavior of the monomeric components of a statistical, optionally crosslinked copoly-condensate, the monomeric components corresponding to formulae (V) and (VI) and the crosslinking agent(s) of formula (VIII) may first be pre-condensed. To this end, the aminosilane corresponding to formula (V), the monomer component corresponding to formula (VI) and the crosslinking agent(s) corresponding to formula (VIII) may be precondensed in the presence or absence of a solvent which dissolves the monomer components, preferably in the presence of a $C_{1-5}$ alcohol corresponding to the alkoxy groups, over a period of 5 minutes to 48 hours at room temperature to 200° C. in the presence of a quantity of water which is not sufficient for complete hydrolysis, preferably in the presence of 1 to 100 mol-% of the quantity of water required for complete hydrolysis. To promote this precondensation effect, another condensation catalyst, for example an inorganic or organic acid or base, or a metal-containing condensation catalyst, such as dibutyl tin diacetate for example, may be added in addition to the amino-organosilane present; ammonia is preferably used. After the pre-condensation step, complete hydrolysis and polycondensation are carried out as described above.

In another possible embodiment of the process according to the invention, block copolycondensates are obtained in which blocks formed from the same units corresponding to formulae (I) and (II) and, optionally, one or more units corresponding to formula (IV) are present.

The precondensation step may also be accelerated by the addition of a small quantity of an acidic or basic condensation catalyst or even a metal-containing condensation catalyst. Ammonia is preferably used. The quantity of water used for the precondensation step depends on the degree of oligomerization, i.e. the block size, which is to be reached. The units formed are of course larger where more water is used for the precondensation step than where less water is used. As already described, the duration of the precondensation step is generally determined by the affinity of the monomeric components for hydrolysis and by the temperature.

In another possible variant of the process, so-called mixed copolycondensates are obtained in which blocks partly formed from the same units corresponding to formula (I) and/or (II) and/or one or more units corresponding to formula (IV) are present, but in which at least one monomeric component is always not precondensed and at least one monomeric component is always precondensed. In this process, at least one or more of the monomers corresponding to formulae (V), (VI) and, optionally, (VIII) is/are precondensed independently of one another as described above and subsequently combined with the remaining, non-precondensed monomers and hydrolysis and polycondensation of the mixture as a whole are subsequently completed after addition of more water and, optionally, more solvent. The polycondensate formed is then further treated as in the other embodiments described above.

In one particularly important embodiment of the production process, spherical material still moist or wet with solvent and water is heat-treated for 1 hour to 1 week at temperatures of 50° to 300° C. and preferably at temperatures of 100° to 200° C., optionally under excess pressure.

This treatment under "steaming" or digesting conditions is also largely intended to improve the mechanical strength and porosity of the shaped material and may even be carried out in the final dispersion of the production process, which contains a liquid phase and the solid product phase, or in water alone.

Accordingly, the above-described embodiment, in which the shaped, but not dried organosiloxane copolycondensates obtained are subjected to an aftertreatment, is characterized in that the solid formed in the shape of spheres is subjected to a heat treatment for 1 hour to 1 week at temperatures of 50° to 300° C. and preferably 100° to 200° C., optionally under excess pressure, in the presence of at least one of the components water or the final liquid phase of the production process in vapor or liquid form. The presence of an acidic, basic or metal-containing catalyst can be of an advantage. In one particularly advantageous embodiment, ammonia is used.

The organosiloxane amine copolycondensates to be used in accordance with the invention are characterized in particular by the quantitative hydrolysis yields, by the elemental analyses and by the determination of the individual functionalities. In purely visual terms, there is no difference between the copolycondensates obtained by the various production processes. Depending on the pretreatment, the preferred spherically shaped copolycondensates have a particle diameter of 0.01 to 3.0 mm and preferably 0.05 to 2.0 mm, a specific surface of 0.0001 to 1,000 m$^2$/g and preferably 0.001 to 700 m$^2$/g, a specific pore volume of 0.01 to 6.0 ml/g and an apparent density of 50 to 1,000 g/l and preferably 0.100 to 800 g/l. The adjustable pore diameters are in the range from 0.1 to more than 1,000 nm.

The chemical stability of the products to be used in accordance with the invention is comparable with that of unshaped products, i.e. is distinctly above 150° C. in air and above 200° C. in an inert gas atmosphere, depending on the individual functionalities.

The specific pore volume, the pore diameter and the surface properties are crucial to the suitability of the products as absorbers. These factors may be influenced, on the one hand, through the production and aftertreatment processes and, on the other hand, through the chemical composition, for example through the incorporation of hydrophobicizing crosslinking groups in the polysiloxane skeleton.

The catalysts to be recovered in accordance with the invention include all the rhodium and ruthenium compounds suitable for the hydrogenation of NBR in an organic solvent (for example chlorobenzene, dichlorobenzene, acetone, butanone) in homogeneous phase.

Preferred rhodium compounds correspond to the following formulae:

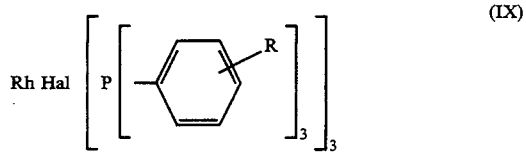

(IX)

or

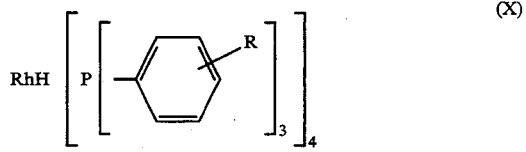

(X)

in which

Hal is a halogen atom from the chlorine, bromine, iodine series and

R is hydrogen, hydroxy, C$_{1-6}$ alkyl (for example methyl, isopropyl), C$_{1-6}$ alkoxy (for example methoxy), C$_{1-6}$ alkoxycarbonyl (for example methoxycarbonyl, ethoxycarbonyl) or halogen from the fluorine, chlorine, bromine, iodine series.

Rhodium compounds corresponding to formula (IX), in which Hal=Cl, Br and R=H, and to formula (X), in which R=H are preferred.

Preferred ruthenium compounds correspond to the following formula $$RuX_{2y}[(L^1)_n (L^2)_{5-z}]$$ (XI)

in which

X is hydrogen, halogen, SnCl$_3$,

L$^1$ is hydrogen, halogen, (R$^6$COO)$_n$ and cyclopentadienyl corresponding to the following formula

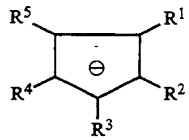

in which R$^1$ to R$^5$ independently of one another represent hydrogen, methyl, ethyl or phenyl; adjacent substituents together may even form a hydrocarbon radical such that L$^1$ is an indenyl or fluorenyl system, L$^2$ is the phosphane, bisphosphane or arsane, y=0, 0.5 or 1, n=1 or 2, z=an integer of 1 to 4, R$^6$ is alkyl, cycloalkyl, aryl or aralkyl containing 1 to 20 carbon atoms.

Examples of L$^1$ ligands of the cyclopentadienyl type include cyclopentadienyl, pentamethyl cyclopentadienyl, ethyl tetramethyl cyclopentadienyl, pentaphenyl cyclopentadienyl, dimethyl triphenyl cyclopentadienyl, indenyl and fluorenyl. The benzene rings in the L$^1$ ligands of the indenyl and fluorenyl type may be substituted by C$_{1-6}$ alkyl radicals, more particularly methyl, ethyl and isopropyl; by C$_{1-4}$ alkoxy radicals, more particularly methoxy and ethoxy; by aryl radicals, more particularly phenyl, and by halogens, more particularly fluorine and chlorine. Preferred L$^1$ ligands of the cyclopentadienyl type are the unsubstituted cyclopentadienyl, indenyl and fluorenyl radicals.

In the ligand L$^1$ of the (R$^6$. COO)$_n$ type, R$^6$ includes, for example, linear or branched, saturated hydrocarbon radicals containing 1 to 20, preferably 1 to 12 and more preferably 1 to 6 carbon atoms, cyclic saturated hydrocarbon radicals containing 5 to 12 and preferably 5 to 7 carbon atoms, aromatic hydrocarbon radicals from the benzene series containing 6 to 18 and preferably 6 to 10 carbon atoms, aryl-substituted alkyl radicals of which the aliphatic part consists of a linear or branched C$_{1-6}$ hydrocarbon radical and the aromatic part of a radical from the benzene series, preferably phenyl.

The above-mentioned radicals R$^6$ may optionally be substituted by hydroxy, C$_{1-6}$ alkoxy, C$_{1-6}$ carbalkoxy, fluorine, chlorine or di-C$_{1-4}$-alkylamino; in addition, the cycloalkyl, aryl and aralkyl radicals may be substituted by C$_{1-6}$ alkyl. Alkyl, cycloalkyl and aralkyl groups may contain keto groups.

Examples of the radical R$^6$ are methyl, ethyl, propyl, isopropyl, tert. butyl, cyclohexyl, phenyl, benzyl and trifluoromethyl. Preferred radicals R$^6$ are methyl, ethyl and tert. butyl.

Preferred L$^2$ ligands are phospanes and arsanes corresponding to the following formulae

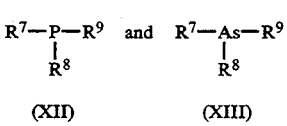

(XII)      (XIII)

in which R$^7$, R$^8$ and R$^9$ independently of one another have the same meaning as R$^6$.

Preferred L$^2$ ligands corresponding to formulae (XII) and (XIII) are triphenyl phosphane, diethylphenyl phosphane, tritolyl phosphane, trinaphthyl phosphane, diphenyl methyl phosphane, diphenyl butyl phosphane, tris-(p-carbethoxyphenyl)-phosphane, tris-(p-cyanophenyl)-phosphane, tributyl phosphane, tris-(trimethoxyphenyl)-phosphanes, bis-(trimethylphenyl)-phenyl phosphanes, bis-(trimethoxyphenyl)-phenyl phosphanes, trimethylphenyl diphenyl phosphanes, trimethoxyphenyl diphenyl phosphanes, tris-(dimethylphenyl)-phenyl phosphanes, tris-(dimethoxyphenyl)-phosphanes, bis-(dimethylphenyl)-phenyl phosphanes, bis-(dimethoxyphenyl)-phenyl phosphanes, dimethylphenyl diphenyl phosphanes, dimethoxyphenyl diphenyl phosphanes, triphenyl arsane, ditolylphenyl arsane, tris-(4-ethoxyphenyl)-arsane, diphenyl cyclohexyl arsane, dibutylphenyl arsane and diethyl phenyl arsane. Triaryl phosphanes, above all triphenyl phosphane, are particularly preferred.

Other examples of $L^2$ ligands are bisphosphanes corresponding to the following formula

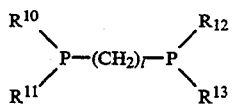

in which l is an integer of 1 to 10 and $R^{10}$, $R^{11}$, $R^{12}$ and $R^{13}$ independently of one another have the same meaning as $R^6$.

Examples of bisphosphanes are 1,2-bis-diphenyl phosphanoethane, 1,2-bis-dianisyl phosphanoethane, 1,3-bis-diphenyl phosphanopropane and 1,4-bis-diphenyl phosphanobutane. 1,2-bis-diphenyl phosphanoethane is preferred, 1,3-bis-diphenyl phosphanopropane and 1,4-bis-diphenyl phosphanobutane being particularly preferred.

The definition of the compounds (XI) is also intended to encompass compounds in which $L^1$ and $L^2$ are joined to one another by one or more covalent bonds. Examples of compounds such as these are compounds corresponding to the following formula

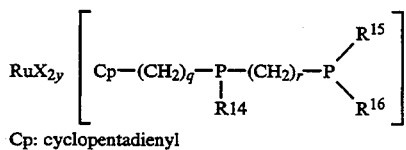

Cp: cyclopentadienyl in which q and r independently of one another represent an integer of 1 to 6 and $R^{14}$ to $R^{16}$ independently of one another have the same meaning as $R^6$.

Examples of ligands in square brackets in formula (XV) are 1,4-diphospha-6-cyclopentadienyl-1,1,4-triphenyl hexane, preferably 1,5-diphospha-7-cyclopentadienyl-1,1,5-triphenyl heptane and, in particular, 1,6-diphospha-8-cyclopentadienyl-1,1,6-triphenyl octane.

The Rh compounds (IX) and (X) are known. The Ru compounds (XI) and (XV) are largely known and may be prepared, for example, in accordance with P. S. Hallmann, B. R. McGarvey and G. Wilkinson in J. Chem. Soc. (A), 1968, pages 3143–3150, M. I. Bruce, N. J. Windsor in Aust. J. Chem. 30, (1977), pages 1601–1604, T. Kauffmann and J. Olbrich in Tetrahedron Letters 25, (1984), pages 1967–1970, T. Wilczewsky, M. Bochenska and J. F. Biernat in J. Organomet. Chem. 215, (1981), pages 87–96, R. W. Mitchell, A. Spencer and G. Wilkinson in J. Chem. Soc. Dalton 1973, page 852 D. Rose, J. D. Gilbert, R. P. Richardson and G. Wilkinson in J. Chem. Soc. (A) 1969, pages 2914–2915, A. Dobson, S. D. Robinson and M. F. Uttley in J. Chem. Soc. Dalton 1975, page 376, L. A. Oro, M. A. Ciriano, M. Campo, C. Foces-Foces and F. H. Cano in J. Organomet. Chem. 289 (1985) 117–131, DE-OS 33 37 294, R. O. Harris, N. K. Hota, L. Sadavoy and M. J. C. Yuen in J. Organomet. Chem. 54 (1973), 259–264, T. Blackmore, M. I. Bruce and F. G. A. Stoue in J. Chem. Soc., Section A 1971, pages 2376–2382, or by analogous methods.

The following are particularly preferred ruthenium complex catalysts corresponding to formula (XI):

$RuCl_2 (PPh_3)_3$ $RuHCl (PPh_3)_3$ $RuH_2 (PPh_3)_4$ $RuH_4 (PPh_3)_3$ $RuH (CH_3COO) (PPh_3)_3$ $RuH (C_2H_5COO) (PPh_3)_3$ $RuH [(CH_3)_3C.COO] (PPh_3)_3$ $Ru (CH_3 COO)_2 (PPh_3)_2$ $RuCl (Cp) (PPh_3)_2$ $RuH (Cp) (PPh_3)_2$ $Ru (SnCl_3) (Cp) (PPh_3)_2$ $RuCl (\eta^5-C_9H_7) (PPh_3)_2$ $RuH (\eta^5-C_9H_7) (PPh_3)_2$ $Ru (SnCl_3)(\eta^5-C_9H_7) (PPh_3)_2$ $RuCl (\eta^5-C_{13}H_9)(PPh_3)_2$ $RuH (\eta^5-C_{13}H_9)(PPh_3)_2$ $Ru (SnCl_3)(\eta^5-C_{13}H_9)(PPh_3)_2$ $RuCl (\eta^5-C_9H_7)(doppe)$ "Ph"=phenyl, "Cp"=cyclopentadienyl and "dppe"=1,2-bis-diphenyl phosphanoethane.

In the context of the invention, catalysts are said to be soluble if more than 50% by weight, preferably more than 65% by weight and, more preferably, more than 80% by weight of 3.4 g of catalyst dissolved in 2 liters of the particular solvent at 20° C.

Preferred organic solvents for hydrogenation with soluble Rh compounds are chlorinated aromatic hydrocarbons, for example chlorobenzene and dichlorobenzenes.

Preferred organic solvents for hydrogenation with soluble Ru compounds are $C_{3-6}$ ketones, more particularly mixtures of a) $C_{3-6}$ ketone and b) monohydric secondary or tertiary $C_{3-6}$ alcohol, the percentage by weight of alcohol b) in the solvent mixture comprising 2 to 60, preferably 5 to 50 and, more preferably, 7 to 40% by weight.

Preferred $C_{3-6}$ ketones are, for example, acetone, butanone, pentanones, cyclopentanone and cyclohexanone and mixtures thereof. A single ketone is preferably used as the solvent or solvent component. Butanone and, in particular, acetone are preferred.

Preferred $C_{3-6}$ alcohols are, for example, 2-propanol, 2-butanol, 2-methyl-2-propanol, 2- and 3-pentanol, 3-methyl-2-butanol, 2-methyl-2-butanol, 2-, 3- and 4-hexanol, 4-methyl-2-pentanol. The preferred alcohol is 2-methyl-2-propanol and, more particularly, 2-butanol. 2-Propanol is most particularly preferred.

The concentration of catalyst (expressed as rhodium or ruthenium and based on HNBR) is generally from 2 to 1,000 ppm, preferably from 5 to 300 ppm and more preferably from 8 to 200 ppm. The concentration of HNBR, based on the solution as a whole, is generally 0.1 to 90% by weight and preferably 2 to 40% by weight.

The absorber to be used in accordance with the invention is generally used in quantities of 0.01 to 80% by weight, preferably in quantities of 0.1 to 70% by weight and, more preferably, in quantities of 1 to 60% by weight, based on HNBR. Before they are used, the absorbers are preferably swollen to constant weight in the same solvent in which HNBR is dissolved.

In the most simple embodiment, the spent catalyst may be absorbed onto the absorber to be used in accordance with the invent-ion either by suspending the absorber in the HNBR solution (stirred tank method) and removing it again from this solution after an appropriate residence time or by passing the HNBR solution through an absorber-containing layer and preferably through a column packed with absorber (column method). Other embodiments are possible, including for example the use of a cascade of stirred tanks in countercurrent or split. Recovery of the hydrogenation catalyst is advantageously carried out at a temperature of 10° to 150° C. and preferably at a temperature of 30° to 120° C. Elevated temperatures have proved to be of advantage.

The residence times may vary within wide limits and depend in particular on the temperature and on the tolerated residual catalyst content of the HNBR solution. Good results are generally obtained with residence times of 0.5 to 15 hours and preferably 1 to 10 hours.

For a given quantity of absorber and a given temperature, the residence time selected is so long that any further increase in the residence time has no effect on the quantity of catalyst recovered.

Recovery of the noble metal from the absorber may basically be carried out by two different methods:
1. The absorber and any adhering HNBR can be burnt and the noble metal oxide present in the combustion residue may be worked up to the catalyst.
2. The absorber may be rinsed free from HNBR and the catalyst subsequently extracted by a suitable solvent, the solvent removed and the catalyst re-used providing it still has the desired activity (otherwise it is worked up).

EXAMPLES

A. Production of the absorbers
Absorber 1

76.9 g (0.18 mol) $(C_6H_5)P[(CH_2)_3Si(OCH_3)_3]_2$, 223.1 g (0.35 mol) $N[(CH_2)_3Si(OC_2H_5)_3]_3$ and 73.8 g (0.35 mol) $Si(OC_2H_5)_4$ were combined in 350 ml ethanol. The mixture was heated to 75° C. in a 3 liter reaction vessel equipped with a KPG stirrer with a half-moon stirrer blade, reflux condenser and internal thermometer. 130 ml deionized water heated to 90° C. were then added to the clear solution, followed by stirring under reflux for 15 minutes and cooling to 70° C. The clear viscous solution was stirred slowly (250 r.p.m.) at that temperature until gelation began. Approx. 1 minute after the beginning of gelation, 600 ml toluene and, after complete homogenization, 700 ml deionized water heated to 50° C. were added, followed by stirring at 700 r.p.m. for 2 h at reflux temperature. After cooling, the entire reaction mixture was transferred to a steel autoclave and stirred slowly for 24 h at 150° C. under the pressure spontaneously established.

The reaction mixture was then cooled and the shaped solid was filtered off from the liquid phase. After drying for 6 hours at 90° C. and then for 12 hours at 130° C. in a nitrogen atmosphere, symmetrical spherical product consisting of polymer units corresponding to the formula

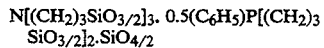

$N[(CH_2)_3SiO_{3/2}]_3 \cdot 0.5(C_6H_5)P[(CH_2)_3 SiO_{3/2}]_2 \cdot SiO_{4/2}$ of which 97% had a particle size of 0.2 to 1.5 mm, were obtained in a yield of 178 g, corresponding to 99.6% of the theoretical.

Specific surface: 456 m²/g
Specific total pore volume: 2.6 ml/g
Apparent density: 423 g/l For subsequent use in the recovery of Rh, the product was sieved in such a way that 87% of the particles were between 0.3 and 1.4 mm in size.

For storage, the product was moistened with water.
Absorber 2

500 ml ethanol were added to 912.1 g (2.06 mol) $S[(CH_2)_3Si(OC_2H_5)_3]_2$, followed by heating to the reflux temperature in a 10 liter quick-fit reactor equipped with a stirrer, reflux condenser and internal thermometer. After the reflux temperature had been reached, 50 ml deionized water were added to the solution. The mixture was then stirred under reflux for 1 hour, followed by the addition of 260.0 g (0.41 mol) $N[(CH_2)_3Si(OC_2H_5)_3]_3$, 429.2 g (2.06 mol) $Si(OC_2H_5)_4$ and 1,200 ml ethanol and another 450 ml water. After stirring under reflux for another 25 minutes, the mixture was cooled to 76° C. and stirred slowly until gelation began. After the beginning of gelation, 2,500 ml 1-hexanol and, after another 10 minutes, 3.0 l deionized water in which 7.5 g polyvinyl alcohol had been dissolved were added. After stirring under reflux for 1 hour, the reaction mixture was cooled and the shaped solid was filtered off. 3.0 l 2% by weight NH$_3$ solution were added to the solid and the whole was transferred to a steel autoclave and stirred for 48 h at 130° C. After cooling, the solid was filtered off, washed with a total of 5.0 l ethanol and then dried under nitrogen for 6 h at 80° C. and then for 18 h at 130° C. A mixed copolycondensate consisting of units corresponding to the following formula

$N[(CH_2)_3SiO_{3/2}]_3 \cdot 5S[(CH_2)_3 SiO_{3/2}]_2 \cdot 5SiO_{4/2}$ was obtained in a total yield of 692 g (99% of the theoretical). More than 96% of the spherical product had a particle size of 0.3 to 1.8 mm.

Specific surface: 636 m²/g
Specific total pore volume: 3.2 ml/g
Apparent density: 366 g/l For subsequent use in the recovery of Rh, the product was sieved so that 86% of the particles were between 0.3 and 1.4 mm in size.

For storage, the product was moistened with water.
Absorber 3

5 ml deionized water were added to 78.8 g (0.125 mol) $N[(CH_2)_3Si(OC_2H_5)_3]_3$, followed by stirring for 1 h at 80° C. At the same time, 121.2 g (0.25 mol) of the thiourea derivative

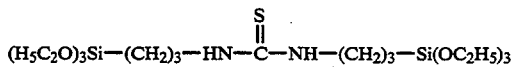

were precondensed for 1 h at 80° C., again after the addition of 5 ml water.

The two precondensates were then combined in 200 ml ethanol and, after addition of an another 50 ml water, were stirred under reflux for 10 minutes, cooled to 70° C. and then stirred again (200 r.p.m.) until gelation began. 30 seconds after the beginning of gelation, 300 ml 1-octanol and, 5 minutes later, 300 ml deionized water were added. The reaction mixture was stirred for 2 h at 600 r.p.m., cooled, the spherical solid was filtered off from the liquid phase, aged in an autoclave as in Example 2 and then extracted. After drying for 8 hours at 90° C. and for 16 hours at 140° C. in an inert gas atmosphere, a block copolycondensate consisting of units corresponding to the following formula N[(CH$_2$)$_3$SiO$_{3/2}$]$_3$. 2S=C[NH-(CH$_2$)$_3$SiO$_{3/2}$]$_2$ was obtained in a yield of 102 g. 94% of the shaped product had a particle size of 0.2 to 1.6 mm.

Specific surface: 456 m$^2$/g
Specific total pore volume: 2.2 ml/g
Apparent density: 445 g/l For subsequent use in the recovery of Rh, the product was sieved so that 84% of the particles were between 0.3 and 1.4 mm in size.

For storage, the product was moistened with water.

B. Use of the absorbers

®Therban 1707 (a product of Bayer AG)—degree of hydrogenation more than 99% acrylonitrile content 34% by weight, Mooney viscosity 75 (ML 1+4) 100° C.—in the form of a solution in chlorobenzene was used as the HNBR.

Example 1

In addition to absorbers having a particle size 0.3 to 1.4 mm, absorbers having a particle size of less than 0.1 mm were used. The latter products were obtained as described above by using more solvent and carrying out dispersion more intensively. The products obtained were correspondingly sieved.

The water-moist absorbers were introduced in different quantities, expressed as dry matter, into a 500 ml three-necked stirred glass flask and washed three times with 50 ml methanol. The supernatant solution was removed. 5% by weight HNBR solutions were added to the absorbers and the suspensions obtained were stirred for 2 h at 80° C. to 120° C. The absorbers were removed by hot filtration through a filter cloth. Aliquots of the filtrates were concentrated by evaporation in a vacuum drying cabinet to isolate the HNBR which was then quantitatively analyzed for rhodium by atomic absorption spectroscopy (AAS). The results are shown in Table 1. The Rh content of the HNBR starting solution was 58 ppm, based on rubber.

TABLE 1

Recovery of catalyst from HNBR solution using suspended absorber
Rhodium recovered [% of the theoretical]
Parts by weight absorber per 100 parts by weight HNBR/temperature

| Absorber type | | Quantity | | | | | | | | |
|---|---|---|---|---|---|---|---|---|---|---|
| | | 50 80° C. | 25 80° C. | 12.5 80° C. | 6.25 80° C. | 6.25 100° C. | 6.25 120° C. | 3 80° C. | 3 100° C. | 3 120° C. |
| A | 2 | 76 | 81 | 52 | 43 | 45 | 36 | 14 | 14 | 41 |
|   | 3 | >98 | 98 | 97 | 97 | 98 | 98 | 90 | 95 | 93 |
|   | 1 | >98 | >98 | 91 | 91 | 95 | 97 | 69 | 76 | 90 |
| B | 2 | 34 | 24 | 12 | | | | | | |
|   | 3 | 91 | 91 | 84 | | | | | | |
|   | 1 | 78 | 62 | 55 | | | | | | |

A: Absorber particle diameter <0.1 mm
B: Absorber particle diameter 0.3–1.4 mm

Example 2

To remove water, water-moist absorbers having particle diameters of 0.3 to 1.4 mm (as measured on dry matter) were washed in a glass column with 3 bed volumes of methanol and then with 3 bed volumes of chlorobenzene and subsequently charged 5 times in succession in the glass column with 200 g of a 2.5% by weight HNBR solution in chlorobenzene. The Rh recovery results are shown in Table 2. The Rh content of the HNBR starting solution was 58 ppm, based on rubber.

TABLE 2

Recovery of catalyst from HNBR solution in columns

| Test | Absorber 2 (quantity 31 g)** | | Absorber 3 (quantity 34 g)** | | Absorber 1 (quantity 35 g)** | |
|---|---|---|---|---|---|---|
| | Time* h | Rh recovered [%] | Time* h | Rh recovered [%] | Time h | Rh recovered [%] |
| 1 | 1.3 | 33 | | | | |
| 2 | 1.0 | 28 | | | | |
| 3 | 1.0 | 26 | | | | |
| 4 | 1.2 | 31 | | | | |
| 5 | 1.3 | 22 | | | | |
| 1 | | | 2.0 | 40 | | |
| 2 | | | 2.3 | 40 | | |
| 3 | | | 3.0 | 48 | | |
| 4 | | | 3.0 | 40 | | |
| 5 | | | 2.6 | 43 | | |
| 1 | | | | | 2.3 | 31 |
| 2 | | | | | 3.0 | 45 |
| 3 | | | | | 3.0 | 33 |

TABLE 2-continued

| | Recovery of catalyst from HNBR solution in columns | | | | | |
|---|---|---|---|---|---|---|
| | Absorber 2 (quantity 31 g)** | | Absorber 3 (quantity 34 g)** | | Absorber 1 (quantity 35 g)** | |
| Test | Time* h | Rh recovered [%] | Time* h | Rh recovered [%] | Time h | Rh recovered [%] |
| 4 | | | | | 2.5 | 28 |
| 5 | | | | | 3.0 | 43 |

*Throughflow time for 200 g HNBR solution
**Based on dry matter
Column diameter: 22 mm
Column length: 300 mm
Filling volume: 113 ml

Example 3

To remove water, water-moist absorbers having a particle diameter of 0.3 to 1.4 mm (as measured on dry matter) were washed with 3 bed volumes of methanol in a glass column and subsequently dried overnight in a vacuum drying cabinet at 40° C. A quantity of 0.5 g dry absorber was swollen overnight in 12.7 g chlorobenzene in a separation funnel and then added under nitrogen to 152.3 g of a nitrogen-purged HNBR solution (6.5%) heated to 100° C. in a 500 ml three-necked stirred glass flask. After stirring for 8 h, the absorber was hot-filtered through a filter cloth and, to recover the rubber, the solvent was evaporated off in a vacuum drying cabinet and was then analyzed for rhodium. The Rh content of the HNBR solution used was 60 ppm, based on rubber.

The Rh recovery level was 77% in the case of absorber 1, 38% in the case of absorber 2 and 97% in the case of absorber 3.

We claim:

1. A method for recovering compounds of at least one of rhodium or ruthenium, which have been used for homogeneous catalysis of the hydrogenation of nitrile rubber solution in organic solvent with hydrogen to form a hydrogenated nitrile rubber solution, wherein the organic solvent of said nitrile rubber solution is selected from the group consisting of: a) chlorinated aromatic hydrocarbons; b) $C_{3-6}$ ketones and c) mixtures of $C_{3-6}$ ketones and monohydric secondary or tertiary $C_{3-6}$ alcohols, the percentage by weight of alcohol in the solvent mixture comprising 2–60% by weight, said method comprising contacting the hydrogenated nitrile rubber solution with absorbers wherein the absorbers are organosiloxane copolycondensates in the form of spherical particles 0.01 to 3 mm in diameter consisting of units corresponding to the following formula

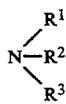  (I)

and of units corresponding to the following formula

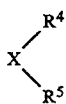  (II)

in which
$R^1$ to $R^5$ may be the same or different and represent a group corresponding to the formula

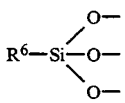  (III)

$R^6$ is directly attached to the nitrogen atom or to the two-bond group X and is a linear or branched $C_{1-10}$ alkylene group, a $C_{5-8}$ cycloalkylene group or a unit corresponding to the following formula

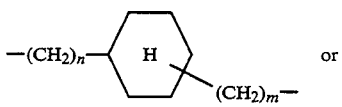

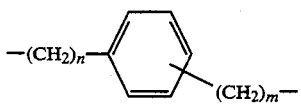

in which
n is a number of 1 to 6 and indicates the number of methylene groups bonded to nitrogen or X and
m is a number of 0 to 6, the free valencies of the oxygen atoms attached to the silicon atom being saturated, as in silica structures, by at least one of silicon atoms of other groups corresponding to formula (III) or the metal atoms in one or more of the crosslinking bridge members

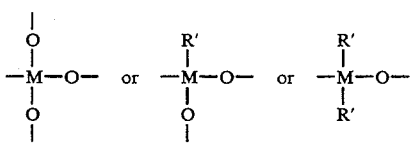  (IV)

or

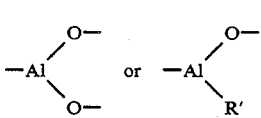

in which
M is a silicon, titanium or zirconium atom and
R' is a linear or branched alkyl group containing 1 to 5 carbon atoms or a phenyl group and the ratio of the silicon atoms from the groups of formula (III) to the metal atoms in the bridge members (IV) is 1:0 to 1:20 and, in formula (II),
X represents

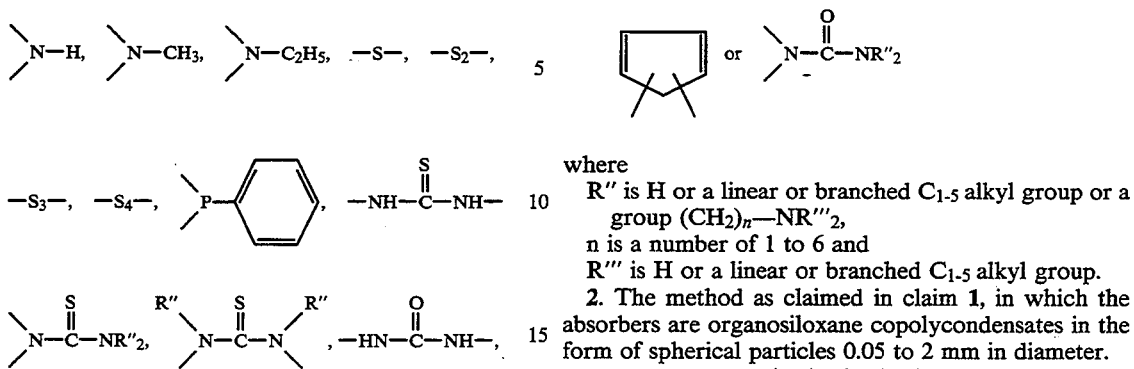
where
R" is H or a linear or branched $C_{1-5}$ alkyl group or a group $(CH_2)_n$—NR'''$_2$,
n is a number of 1 to 6 and
R''' is H or a linear or branched $C_{1-5}$ alkyl group.
2. The method as claimed in claim 1, in which the absorbers are organosiloxane copolycondensates in the form of spherical particles 0.05 to 2 mm in diameter.
* * * * *

UNITED STATES PATENT AND TRADEMARK OFFICE
CERTIFICATE OF CORRECTION

PATENT NO. : 5,403,566
DATED : April 4, 1995
INVENTOR(S) : Panster et al

It is certified that error appears in the above-indentified patent and that said Letters Patent is hereby corrected as shown below:

On the title page, Item [56] References Cited, the following patent should be inserted --4,999,413 3/1991 Panster et ......528/30--.

Signed and Sealed this

Fourth Day of June, 1996

Attest:

BRUCE LEHMAN

Attesting Officer

Commissioner of Patents and Trademarks